US005631751A

United States Patent [19]

Kim

[11] Patent Number: 5,631,751

[45] Date of Patent: May 20, 1997

[54] REAR-PROJECTION DISPLAY WITH AUXILIARY MIRROR BETWEEN LIGHT SOURCE AND LIQUID CRYSTAL DISPLAY

[75] Inventor: Jung-soo Kim, Suwon, Rep. of Korea

[73] Assignee: Samsung Electronics Co., Ltd., Kyungki-do, Rep. of Korea

[21] Appl. No.: 637,607

[22] Filed: Apr. 25, 1996

[30] Foreign Application Priority Data

Apr. 25, 1995 [KR] Rep. of Korea ........................ 95-9802

[51] Int. Cl.$^{6}$ ............................ G02F 1/13; G02F 1/1335

[52] U.S. Cl. .................................................. 349/5; 349/62

[58] Field of Search .................................. 359/40, 41, 49

[56] References Cited

U.S. PATENT DOCUMENTS 3,631,288 12/1971 Rogers .................................... 313/112

5,541,746 6/1996 Hamagishi et al. ....................... 359/49

5,555,186 9/1996 Shioya ..................................... 359/40

*Primary Examiner*—William L. Sikes

*Assistant Examiner*—Julie-Huyen Ngo

*Attorney, Agent, or Firm*—Sughrue, Mion, Zinn, Macpeak & Seas

[57] ABSTRACT

A rear-projection display for providing uniform brightness to images projected onto a screen. An auxiliary mirror, which allows a portion of incident light to pass therethrough and reflects another portion of the light, is disposed between a light source and an image display such that only a portion of the light from said light source is incident upon said auxiliary mirror. A main reflection mirror reflects light emitted from the light source and directs the light through an image display. The reflected light from the auxiliary mirror is incident on the main mirror.

5 Claims, 2 Drawing Sheets

REAR-PROJECTION DISPLAY WITH AUXILIARY MIRROR BETWEEN LIGHT SOURCE AND LIQUID CRYSTAL DISPLAY

BACKGROUND OF THE INVENTION

1. Field of the Invention

The present invention relates to a rear-projection display, and more particularly, to a rear-projection display having an optical system which includes an auxiliary mirror placed between a light source and a liquid crystal display (LCD) panel which transmits a portion of incident light and reflects another portion thereof to provide uniform brightness of images projected on a screen.

2. Description of the Related Art

Recently, the demand for large image displays has increased. However, there are practical limitations to achieving large image displays because the size of a cathode ray tube (CRT) must be large in order to obtain a large screen. Even if the technical problems of manufacturing such a large CRT can be resolved, the increased weight of the CRT would impose constraints on manufacturing a television set or the like employing the large CRT as a display. Thus, alternative ways to obtain a practical large display screen have been explored. Image projection systems such as projection televisions or video projectors are examples of such alternatives.

In the above-noted image projection systems, an image is generated by using an image displaying device such as a small CRT or an LCD, then magnifying and projecting the image with an optical system onto a large screen. The desire for a large screen has made systems like this commercially popular.

Image projection systems can be grouped into front-projection types and rear-projection types, depending on the mechanism used to magnify and project an image onto the screen. A typical front-projection display is provided with a white light lamp as a light source and three transmission LCDs. White light emitted from the white light lamp is separated into three colors (red, green and blue). Each separated color is illuminated on an LCD which displays an image corresponding to a video signal for that color. The colored lights which have passed through their respective LCDs are combined by a color discriminating mirror, are superposed, and are directed to be incident on a projection lens which projects the image displayed on each LCD onto a screen as a single color image.

However, such a front-projection display has a distinct drawback in that, due to its structure, there is poor contrast on the screen when the viewing surroundings are bright. Therefore, the surrounding illumination must be as dim as possible, like that of a movie theater, in order to improve the contrast on the screen. In addition, as a viewer deviates from a position which is directly perpendicular to the plane of the screen, the contrast of the displayed image decays.

In an effort to overcome the drawbacks of the front-projection display, rear-projection display (FIG. 1) devices have been developed. The rear-projection display can be made slimmer than a front-projection display, and the brightness of images displayed on the screen is superior.

Referring to FIG. 1, light emitted from a light source 4 is reflected by a reflection mirror 2 and is projected onto an LCD panel 6 driven by a liquid crystal driving portion 9. Then, an image displayed on LCD panel 6 is magnified onto a screen 10 by a magnifier 8. However, the conventional rear-projection display projects light from a central light source of a high luminance by means of a simple reflection apparatus, i.e. a single mirror. Thus, as shown in FIG. 4A, the brightness at the center of screen 10, which corresponds to the position of the light source, is different than the brightness at other areas of the screen.

SUMMARY OF THE INVENTION

The present invention is intended to overcome the problems noted above. The object of the present invention is to provide a rear-projection display which provides uniform brightness of images projected onto a screen. This is accomplished by providing an auxiliary mirror between a light source and a liquid crystal panel. The auxiliary mirror allows a portion of incident light to pass therethrough and reflects a portion of the light.

Specifically, the invention is a rear-projection display having a light source, a main reflection mirror for reflecting light emitted from the light source, an image display for projecting a predetermined image formed thereon by parallel incident light reflected from the main reflection mirror, a magnifier for magnifying the projected image, and a screen positioned perpendicular to the path of light that has passed through the magnifier. The rear-projection display also has an auxiliary mirror installed between the light source and the image display which allows a portion of incident light from the light source to pass therethrough and reflects a portion of the light to the main reflection mirror.

It is preferred that the image display of the rear-projection system according to the present invention is an LCD panel or a polymer dispersion LCD panel.

BRIEF DESCRIPTION OF THE DRAWINGS

The above object and advantages of the present invention will become apparent based on the following description of a preferred embodiment thereof with reference to the attached drawings in which.

DETAILED DESCRIPTION OF THE PREFERRED EMBODIMENT

Figure 1:
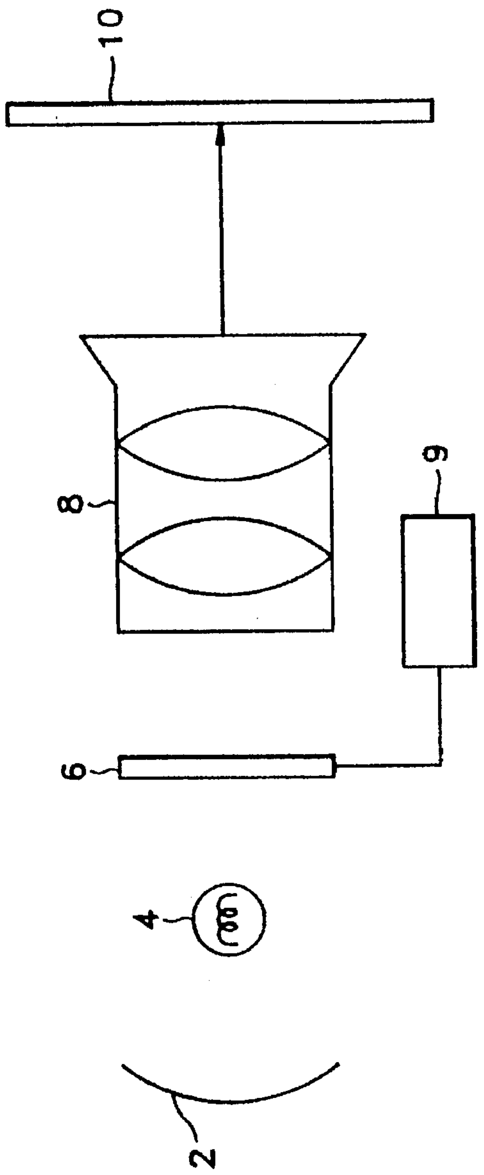
FIG.1 (PRIOR ART)
FIG. 1 shows the components of the optical system of a conventional rear-projection display.
Figure 2:
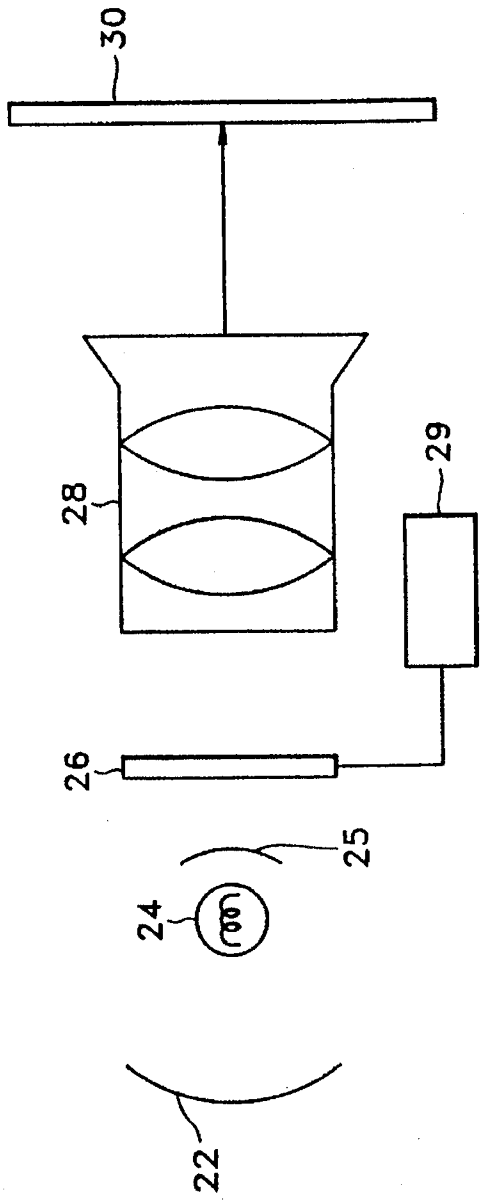
FIG. 2 shows the components of the optical system of a rear-projection display according to the preferred embodiment of the present invention.

FIG. 2 shows the arrangement of the components of the optical system of a rear-projection display according to the preferred embodiment of the present invention. White light emitted from a light source 24 is reflected from both a main reflection mirror 22 and an auxiliary mirror 25 and is directed to fall incident on an LCD panel 26 driven by a known liquid crystal driving portion 29. An image displayed on LCD panel 26 is thus projected onto a screen 30 through an optical system including a magnifier 28.

Auxiliary mirror 25 is made of a known material which allows it to reflect a portion of light incident thereon to main reflection mirror 22 while a portion of the incident light passes through auxiliary mirror 25. Auxiliary mirror 25 is smaller than main reflection mirror 22 and its size is adjusted according to the size and position of light source 24. The relative sizes can be determined experimentally or empirically. LCD panel 26 may be replaced with a polymer dispersion LCD panel, or another transmissive display device.

Figure 3:
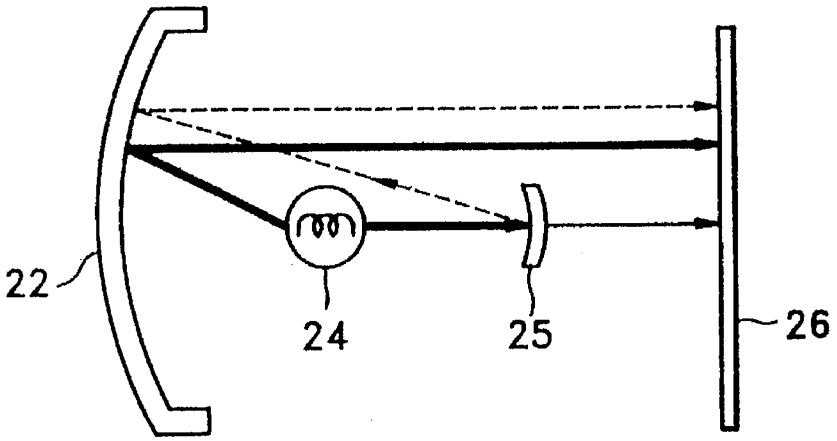
FIG. 3 shows the path in which light travels from the light source to the screen of the embodiment of FIG. 2.
Figure 4A:
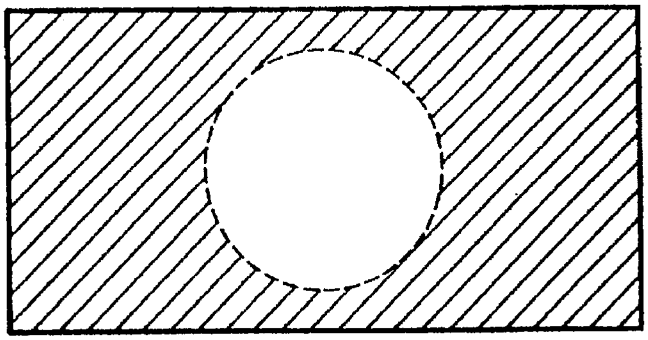
FIG.4A(PRIOR ART)
FIG. 4A schematically shows the luminance distribution of a video signal on a screen of a conventional rear-projection display.
Figure 4B:
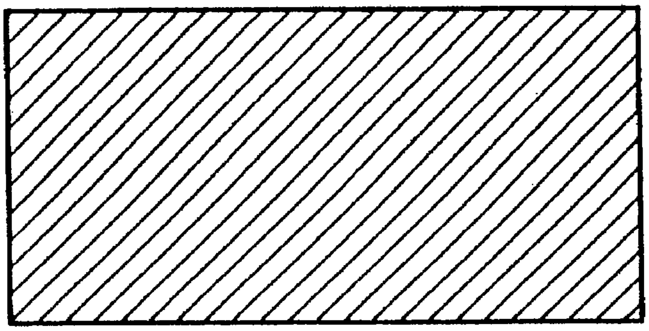
FIG. 4B schematically shows the luminance distribution of a video signal on a screen of a rear-projection display according to the preferred embodiment of the present invention.

The manner in which light from the light source 24 is reflected by the auxiliary reflection mirror 25 and the main reflection mirror 22 is shown in FIG. 3. Light emitted from light source 24 and reflected by the main reflection mirror 22 and auxiliary mirror 25 is collected on LCD panel 26. A portion of the light incident on auxiliary mirror 25 (indicated by the solid line) passes through while another portion (indicated by the dashed line) is reflected to main reflection mirror 22. In this way, auxiliary mirror 25 controls the intensity of the light collected on the middle portion of LCD panel 26, by blocking, transmitting, and reflecting portions of the light emitted directly from the light source 24. Thus, light is uniformly illuminated on screen 30 as shown in FIG. 4B.

As described above, the rear-projection display according to the present invention is provided with an auxiliary mirror between a light source and an an image display. Therefore, the image projected onto a screen has uniform brightness. One skilled in the art will recognize that various modifications can be made to the disclosed embodiment without departing from the scope of the appended claims.

What is claimed is:

1. A rear-projection display device comprising:

a light source;

a main reflection mirror for reflecting light emitted from said light source;

an image display having a predetermined image displayed thereon, said image being projected by incident light reflected from said main reflection mirror;

a magnifier for magnifying said projected image;

a screen positioned in the path of light that has passed through the magnifier for receiving the projected image; and an auxiliary mirror disposed between said light source and said image display such that only a portion of the light from said light source is incident upon said auxiliary mirror, said auxiliary mirror allowing a portion of incident light from said light source to pass through said auxiliary mirror and reflecting a portion of the incident light to said main reflection mirror.

2. A rear-projection display as claimed in claim 1, wherein said image display is one of an LCD panel and a polymer dispersion LCD panel.

3. A rear-projection display as claimed in claim 1, wherein the incident light reflected from said main reflection mirror is parallel light.

4. A rear-projection display as claimed in claim 3, wherein said screen extends perpendicular to the parallel light.

5. A rear-projection display as claimed in claim 1, wherein an area of said auxiliary mirror has a surface area that is smaller than a surface area of said main reflection mirror.

* * * * *